United States Patent [19]

Martin et al.

[11] Patent Number: 4,575,045
[45] Date of Patent: Mar. 11, 1986

[54] ROTARY COCK WITH GENERALLY SPHERICAL VALVE MEMBER

[75] Inventors: Roger Martin, Saint-Cyr; Laurent Buffa, Annonay, both of France

[73] Assignee: Vanatome, Annonay, France

[21] Appl. No.: 735,916

[22] Filed: May 20, 1985

[30] Foreign Application Priority Data

May 18, 1984 [FR] France .................. 84 08177

[51] Int. Cl.⁴ .......................... F16K 25/00
[52] U.S. Cl. ................... 251/172; 251/174; 251/317; 137/629
[58] Field of Search ............. 137/629; 251/172, 174, 251/315, 317

[56] References Cited

U.S. PATENT DOCUMENTS

| | | | |
|---|---|---|---|
| 2,777,664 | 1/1957 | Bryant | 251/174 |
| 2,950,896 | 8/1960 | Büttikor | 251/172 |
| 3,172,192 | 3/1965 | Dresden | 251/315 X |
| 3,392,743 | 7/1968 | Pennington | 251/174 X |
| 3,414,233 | 12/1968 | Priese | 251/172 |
| 4,217,923 | 8/1980 | Kirdensley | 251/315 X |
| 4,262,688 | 4/1981 | Bialkowski | 251/315 |
| 4,392,633 | 7/1983 | Van Winkle | 251/172 X |

*Primary Examiner*—Harold W. Weakley
*Attorney, Agent, or Firm*—Karl F. Ross; Herbert Dubno

[57] ABSTRACT

A ball valve has a movable upstream valve seat with a metal lip engageable with the valve ball under pressure generated by a bellows section or metal membrane connected between the movable valve seat and the housing. The force of fluid pressure against this moveable valve seat is relieved by operation of a bypass valve connecting opposite sides of this seat. The ball can also have a deformable metal lip.

10 Claims, 4 Drawing Figures

ROTARY COCK WITH GENERALLY SPHERICAL VALVE MEMBER

FIELD OF THE INVENTION

Our present invention relates to a rotary ball valve of the movable-seat type and, more particularly, to a ball valve operable at elevated temperature and pressure.

BACKGROUND OF THE INVENTION

Control valves for fluid lines, especially so-called ball valves, generally comprise a valve housing having an inlet and an outlet and between the inlet and the outlet a rotary-valve member which is generally of spherical configuration and has a passage alignable with the inlet passage and with the outlet passage in the "open" position of the valve or cock but rotatable about an axis perpendicular to the axis of the passage in this valve body, to block flow through the valve.

Such valves can be used to cut off flow along a fluid path and have the advantage that they can be actuated rapidly, are highly compact and can ensure blockage of flow and, even more importantly, flow of the fluid without significant disruption of the flow pattern in the sense that turbulence formation is minimized and thus the noise resulting from the presence of the valve or its operation is minimized.

There are two basic types of ball valves. A first of these types is generally termed a floating ball valve and is intended generally to be used in installations working at relatively low pressure and/or with units which have comparatively small dimensions.

In such a valve, during rotation of the ball into its closed position, the ball may undergo a slight translatory movement in the direction of flow of the fluid to ensure a firm seating of the valve member against a downstream seat sealing the valve against further flow past the location at which the seat engages the valve member or ball.

In the second type of ball valve, the upstream seat is movable and can be biased by fluid pressure against the valve member or ball. These valves are used for valves operating at significantly higher pressures and may have greater dimensions and can be used in larger equipment than the first type of the valve described.

In the second type of valve, the valve member or ball is pivotal about a fixed axis corresponding to the axis of an actuating shaft and lever. The biasing of the upstream seat against the valve member is ensured by a differential piston action based upon the fact that the effective cross section of the upstream seat is greater than the effective downstream cross section at which this seat engages the valve member. The seal between the seat and the valve member is provided by an elastomeric seal or the like.

When the seals engaging the ball or the surface of the latter have good coefficients of sliding friction, the opening of the valve does not present a problem even through the pressure of the fluid generates the force with which the seal engages the ball or valve member. Such valves, however, have only limited applicability since they cannot be effectively used for high temperature applications because of the detrimental effects of high temperatures on the seals which have been used. In practice, the seals which have been commonly employed have maximum operating temperatures of 150° C. to 200° C.

OBJECTS OF THE INVENTION

It is, therefore, the principal object of the present invention to provide a ball valve of the type in which fluid pressure assists in sealing against the valve member or ball and yet which is devoid of the disadvantages outlined above.

Another object of this invention is to provide an improved ball valve of the movable-seat type which can be easily opened even in the presence of high pressures, and yet is not susceptible to deterioration at high temperatures as has been the case with earlier valves.

It is also an object of our invention to provide a relatively simple but reliable valve with greater versatility and consequently more widespread applicability than earlier valves operating at elevated temperatures.

SUMMARY OF THE INVENTION

These objects and others which will become apparent hereinafter are attained, in accordance with the present invention, in a ball valve which comprises a housing, a valve member, which may be referred to as a ball or as a generally spheroidal member, rotatable in this housing and having a passage substantially equal in cross section to the inlet and outlet passages with which the valve member passage is alignable in the open position of the valve, and an upstream valve seat surrounding the passage upstream of the valve member and shiftable in the housing axially to engage the valve member in the closed position to form a seal.

This movable seat is provided with a collar to which there is a net force applied by the fluid pressure upstream of the valve member in the direction of the latter, the seat having an annular metal lip which is deformable under the latter pressure and which engages the valve member.

According to an important feature of this invention, a flexible pressure-retentive element, e.g. a bellows or membrane composed of metal, is sealingly affixed at one end of an inlet side of the housing while its other end is sealingly affixed to the movable seat, this flexible element being oriented so that pressure received within this element is applied to the seat in a direction tending to bias the latter against the valve member or ball.

According to another important feature of the invention, means is provided for equalizing the pressure across the seat and thereby ease the force with which the latter bears against the valve member or ball for release of the force and ease in opening the valve by rotating the ball.

During the closing of the valve, therefore, the pressure of the fluid prevailing within the section of the bellows and exerted thereby against the collar or shoulder of the movable seat causes displacement of the seat in the direction of flow of the fluid and thus against the ball. This force is transformed into an elastic deformation of the metal lip of the seat assuring metal-to-metal contact between the valve ball and the seat.

The nature of the material utilized to form the seal, namely, the lip which is metallic and in contact with the metal of the valve ball and which can be formed unitarily with the seat member, ensures that the seal will be maintained at high temperatures and at high pressures.

Because of the metal-to-metal contact of the ball with the seat and the pressure difference between the upstream and downstream sides of the ball, the opening movement of the valve effects must overcome a gripping of the movable-seat member against the valve member. This inconvenience is avoided through use of the aforementioned means for bringing about an equilibrium of the pressure on both sides of the seat prior to opening the valve. With such equilibrium, the movable seat occupies a floating position enabling the valve ball to be rotated to its open position.

According to a feature of the invention, the equilibrating means can include a bypass conduit which opens into the fluid passage upstream of the valve ball and into a chamber formed between the valve body and the seat, this bypass passage being in turn equipped with a valve which can be manually operated. The bypass valve is closed while the main valve body is in its closed position and it is only for opening of the main valve body that the bypass valve is operated to equilibrate the pressures on opposite sides of the upstream seat.

In order to avoid, during such equilibration, significant leakage at the downstream side of the main valve, the latter is equipped with a downstream seat whose sealing element is composed of graphite and is urged by elastic means against the valve ball. The elastic means may include a generally toroidal element of metal opening toward to exterior. It should be noted that it is important to avoid leakage from a location at the downstream side of the movable seat during equilibration if the pressure balance is to be adequate to relieve the force of the movable seat on the ball.

Advantageously the cross section of the passage of the contact zone of the downstream seat on the valve member or ball is less than the passage section of the zone of contact of the upstream seat on the latter.

As a consequence of this arrangement, during closing of the valve there is first a complete sectioning of the liquid flow at the downstream seat and this occurs before closure is complete at the upstream seat. Further movement of the ball, however, completes the closure at the upstream seat so that the final closure operation does not create the considerable pressure differential which later will apply the movable seat against the valve ball.

According to another feature of the invention, the valve ball also has a deformable metallic lip which is positioned to bear against the deformable metallic lip of the upstream seat.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
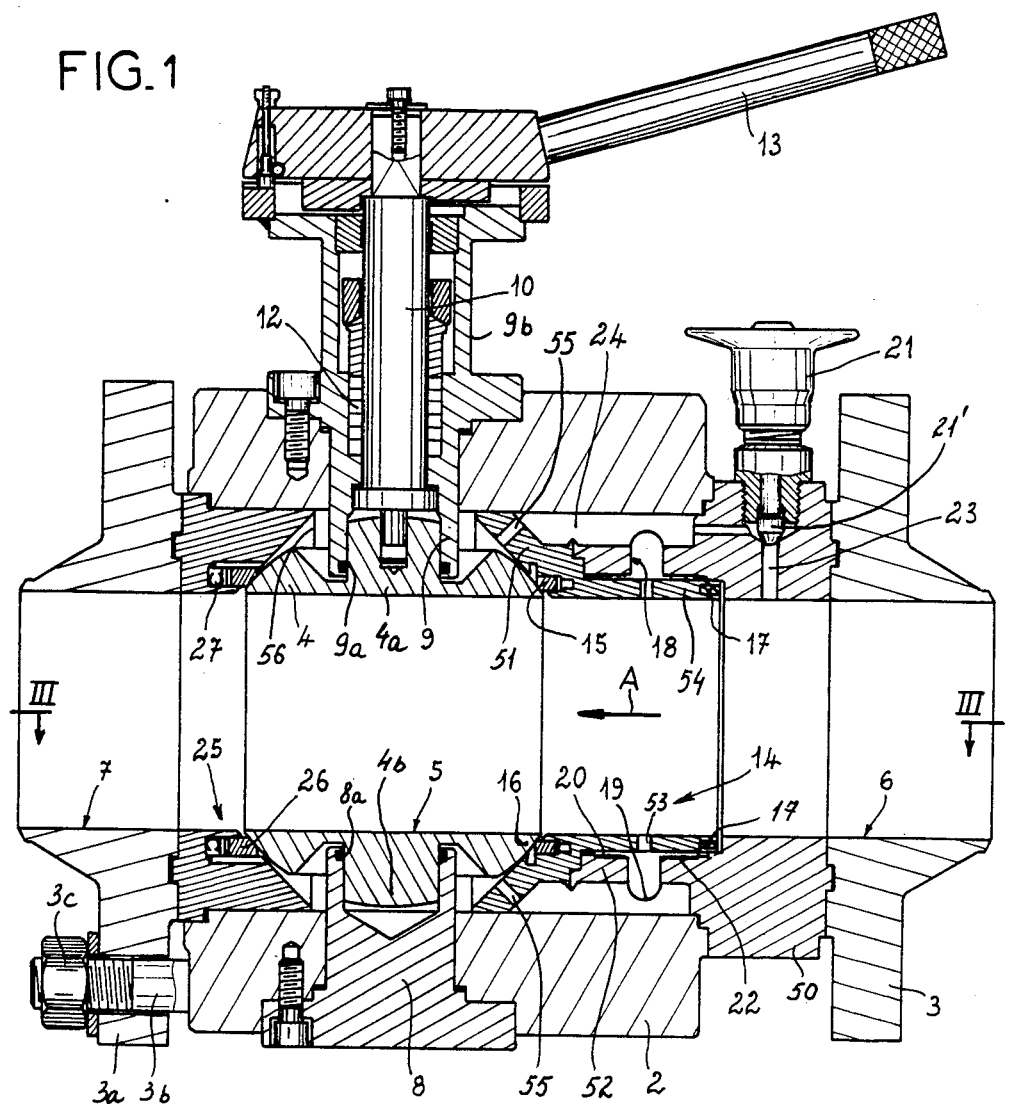
FIG. 1 is an axial cross sectional view through a ball valve in accordance with the present invention.
Figure 3:
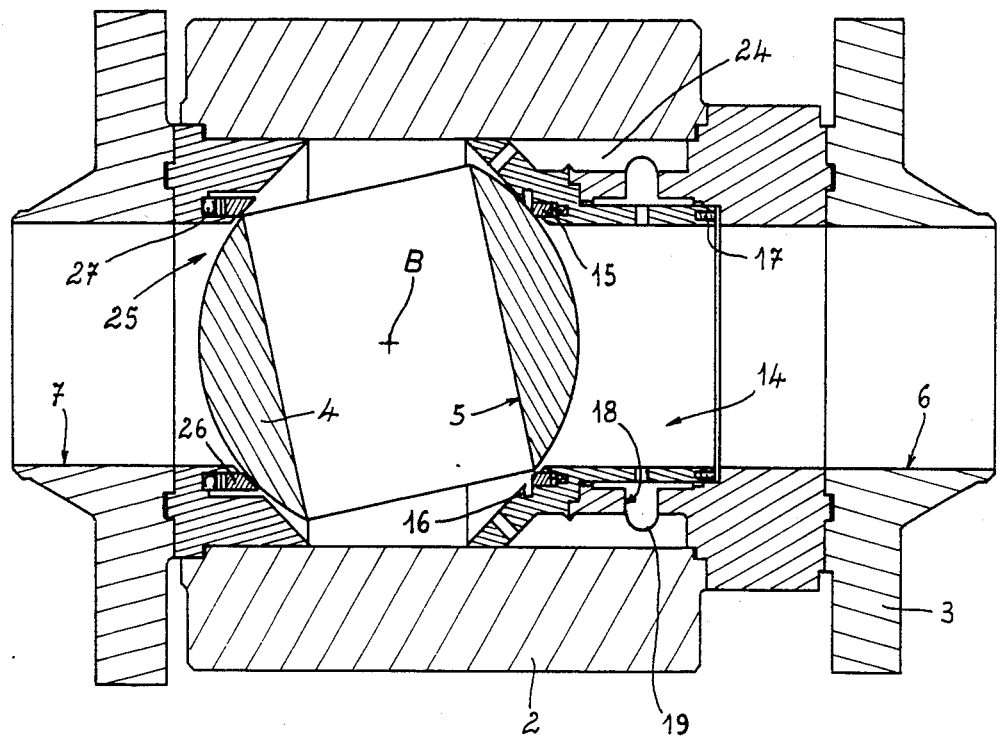
FIG. 3 is a section taken along the line III—III of FIG. 1 showing the valve during the closure operation.
Figure 2:
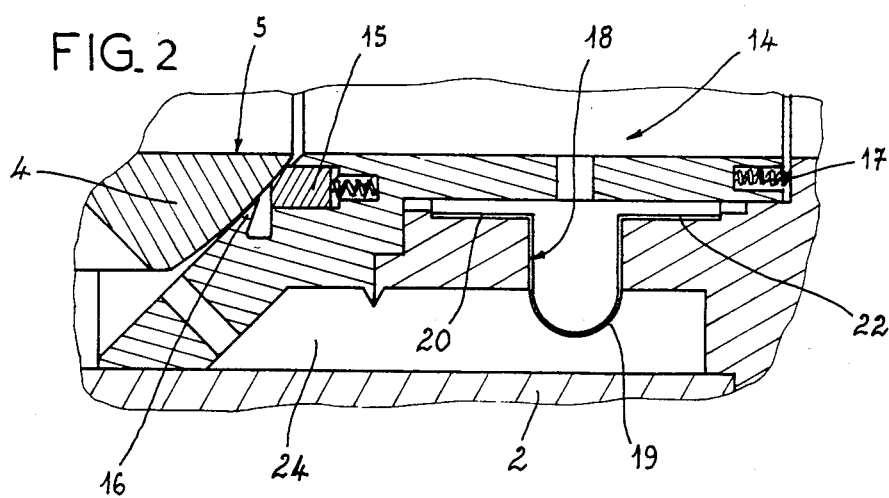
FIG. 2 is a detail section of a portion of this valve in its open position.

The valve shown in FIGS. 1-3 comprises a valve body which has a generally cylindrical configuration and is represented at 2, provided at its ends with flanges 3 and 3a connected together and to the body 2 by bolts, a fragment of one of which has been represented at 3b and nuts 3c threaded onto these bolts.

Within the body 2 a spherical valve member or ball 4 is provided and is rotatable about an axis perpendicular to that of the valve body. The flanges 3 and 3a of the valve body define an inlet 6 at an upstream side of the valve and an outlet 7 at the downstream side of the valve connectable in a pipeline through which the flow of liquid is to be controlled. The inlet and outlet cross sections are the same as the cross section of a central passage 5 of the ball.

The ball 4 is rotatable in a pair of bushes 8, 9 which can have "O" rings 8a, 9a surrounding cylindrical bosses 4a and 4b formed on the ball 4.

The axis of rotation of the ball 4, along which a control shaft 10 extends, lies perpendicular to the axis of the passages 5, 6, 7. Packing rings or seals 12 surround the rotatable shaft 10 which is keyed to the ball 4 and seal the shaft 10 with respect to a sleeve 9b formed on the bush 9. A lever 13 is affixed to the shaft 10 to facilitate its rotation.

Upstream of the ball 4, there is provided a movable seat 14 formed as a sleeve having an internal diameter equal to that of the passage 6 and the passage 5 and traversed by the fluid. The sleeve 14 is received between a valve disk and the ball but is axially movable relative to both of them, the disk 50 being clamped between the flange 3 and the body 2.

At the downstream side, the seat 14 is provided with a frustoconical portion 51 which flares outwardly in the direction of ball 4.

Not only is the seat 14 thus axially displaceable in the direction of flow, but it is provided at its downstream end with a scraper-type of seal 15 spring biased in the direction of the ball 4.

Thus the metallic lip 16 deforms when it engages against the ball 4 with a certain amount of force. The contact of the seat 14 with the ball is assured by a series of springs 17 which can be received in recesses in the seat 14 braced against the plate 50 and therefore pressing the upstream end of the seat with a low degree of force against the ball and thereby effecting a low pressure seal against the latter substantially at all times until the fluid pressure is allowed to come to bear upon the seat via the bellows section 19 in the manner described.

Once closure of the valve is more or less complete, the fluid upstream of the ball acts upon the bellows section 19 which is soldered at 20 and 22 to the seat 14 and the plate 50 and whose cross section is greater than the sealing section of the seat against the ball.

Consequently, a net force is applied by the fluid pressure to the part 18 against a collar 52, transmitting this force to the remainder of the seat in the direction of the arrow A. Ports 53 communicate through the sleeve portion 54 of the seat 14 and the interior of the bellows section 19.

In addition, the valve comprises a bypass passage 23 communicating with the passage 6 upstream of the seat and the ball 4 and where the interior of a chamber 24 formed between the body 2 and the seat 14 and communicating via ports 55 with a chamber 56 on the downstream side of the seat 14.

A relief valve 21 which is manually operable by a tug on the handle to lift the valve member 21' is provided in this passage.

The main valve also has a downstream seat 25 provided with a graphite seal 26 elastically pressed against the ball 4 by metal torus 27 which is incomplete, i.e. is open as shown in FIG. 1, toward the exterior. It should be noted that the passage section delimited by the seal 26 of the stationary downstream seat 25 is less than the passage section defined by the deformable lip 16 of the upstream seat 14.

In operation, the valve portion is shown in its open position in FIG. 1 and can be rotated by the lever 13 in its closed position.

As the ball 4 approaches its closed position (see FIG. 3), the flow of fluid is first completely cut off at the downstream side when the ball reaches the position shown therein. However, closure is not complete at this point at the upstream seat. This permits the remaining closure movement, i e. an angular displacement of the ball 4 about the axis B through an additional fraction of a turn, say 10°.

The pressure in the compartment 24 after complete closure progressively falls and the difference in pressure across the bellows section 19 increases so that a net force is exerted upon the collar 18 in the direction of arrow A until this force is sufficient to cause deformation of the elastic lip 16.

For opening of the valve, the bypass valve 21 is first opened briefly to allow equilibration of pressure through the bypass passage 23 across the seat 14 and thus across the bellows section 19. The force with which the movable seat 14 was applied against the ball 4 is thereby diminished and the seat 14 is shifted somewhat to the right by relaxation of the lip, i.e. into the semifluiding position previously described. The ball 4 is then rotated angularly in the opposite sense with ease because the grip of the seat 14 thereon has been relieved.

Figure 4:
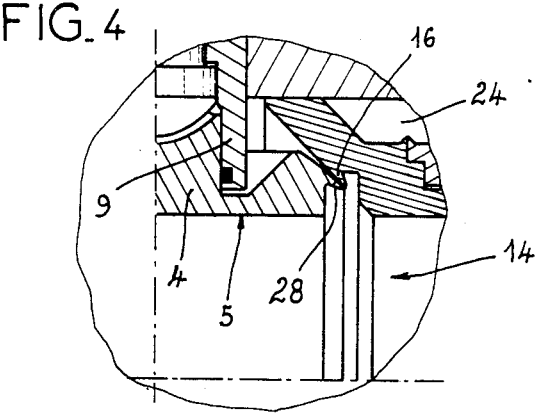
FIG. 4 is a detail view in longitudinal section and drawn to a larger scale illustrating a modification of the embodiment of FIG. 1.

As can be seen from FIG. 4, the ball 4 can have a contact zone for engagement with the seat 14 which is provided, in turn, with a deformable metal lip 28. In that case, the seal upon closure of the valve results from a double deformation of the lip 16 of seat 14 on the one hand and of the lip 28 of the spherical valve member 4 on the other hand.

The valve described clearly does not evidence the temperature sensitivity of earlier valves and thus can be used at high temperatures and high pressures with excellent reliability. Various modifications within the spirit and scope of the appended claims can also be effected since it is clear that neither the main valve member 4 nor the bypass valve 21 need be exclusively manually operable but either or both can be hydraulically, pneumatically or electrically actuated. A bellows section need not be used at 19, this member being then a simple metal membrane.

We claim:

1. A ball valve comprising:
   a housing formed with an inlet at an upstream side and an outlet at a downstream side, said inlet and outlet defining a flow cross section;
   a generally spherical main valve member formed with a passage substantially equal in cross section to said flow cross section and being rotatable in said housing about an axis transverse to said passage between open and closed positions;
   a downstream valve seat in said housing engageable with said member between said member and said outlet;
   an upstream valve seat movably mounted in said housing between said inlet and said valve member, a deflectable annular metallic lip being formed on one of said valve member and said upstream valve seat and being deflectable in said closed position of said member by fluid pressure applied to said upstream valve seat to seal between said upstream valve seat and said valve member;
   a flexible metal element having one side connected to said housing and another side connected to said upstream valve seat for applying fluid pressure at said upstream side to said upstream valve seat in the direction of said valve member to generate a sealing force between said upstream valve seat and said valve member; and
   means for equilibrating pressure on opposite sides of said upstream valve seat for relieving said force prior to shifting of said valve member to said open position.

2. The ball valve defined in claim 1 wherein said upstream valve seat is formed with a collar, said element bearing against said collar.

3. The ball valve defined in claim 2 wherein said element is a metallic membrane.

4. The ball valve defined in claim 2 wherein said element is a bellows section.

5. The ball valve defined in claim 4 wherein said lip is formed on said valve member.

6. The ball valve defined in claim 1 wherein said lip is formed on said upstream valve seat.

7. The ball valve defined in claim 6 wherein said means for equilibrating includes a bypass passage between said upstream side and a location in said housing at a downstream side of said upstream valve member and a bypass valve in said bypass passage actuatable prior to displacement of said valve member.

8. The ball valve defined in claim 7 wherein said bypass passage extends at least in part through said upstream seat.

9. The ball valve defined in claim 8 wherein said downstream seat engages said valve member at a seal having a lesser passage cross section than that of said upstream seat against said valve member.

10. The ball valve defined in claim 9 wherein said valve member further comprises an annular deformable metal lip engageable with said lip on said upstream valve seat.

* * * * *